Patented Nov. 30, 1948

2,454,759

UNITED STATES PATENT OFFICE 2,454,759

METHOD OF PREPARATION OF DIMETHYL SILICONE GUMS

Moyer M. Safford, Schenectady, N. Y., assignor to General Electric Company, a corporation of New York No Drawing. Application June 11, 1946, Serial No. 676,119

4 Claims. (Cl. 260—46.5)

This invention is concerned with the preparation of synthetic elastic compositions comprising dimethyl silicone gums. More particularly, the invention is concerned with a method of making an elastic gum which comprises contacting a dimethyl silicone (dimethyl polysiloxane), preferably a liquid dimethyl silicone, with a sulfuryl halide, for example sulfuryl chloride (SO$_2$Cl$_2$), sulfuryl bromide, sulfuryl fluoride, etc.

One of the more specific embodiments of my invention comprises treating a dimethyl silicone, preferably a liquid dimethyl silicone, with sulfuryl chloride for a length of time and at a temperature sufficient to convert the said dimethyl silicone to a product having elastic properties, compounding the said product with a filler and a curing or vulcanizing agent, and thereafter advancing the cure of the filled material under the influence of heat.

The invention is based on my discovery that elastic gums may be prepared by suitable treatment of dimethyl silicones; also, that such elastic gums may be compounded with fillers, cure accelerators, etc., and molded or extruded to form products exhibiting all of the physical characteristics, such as elasticity, compressibility, etc., of known natural rubber and other synthetic elastomers. The products are characterized by their flexibility at low temperatures and particularly by their heat-resistance. The synthetic dimethyl silicone elastomers made from these elastic gums retain their tensile strengths, elongation or stretch, flexibility, etc., even when heated for long periods of time at elevated temperatures, e. g., from 150° to 200° C., without deterioration.

The dimethyl silicones found suitable for the preparation of the elastic gums as well as the synthetic elastomers possessing the above-mentioned properties are those obtained, e. g., by the hydrolysis of a pure or substantially pure dimethyl dihalogenosilane, e. g., dimethyl-dichlorosilane, or a dimethyl-substituted silane (the methyl groups being joined to the silicon atoms through carbon atoms), whose other two valences are satisfied by radicals which themselves are readily hydrolyzable, for instance, hydrogen, amino, alkoxy, aroxy, acyloxy, etc.) radicals. While the term "dimethyl silicone" has been broadly used to designate complex condensation products containing an average of two methyl groups per silicon atom, it is used herein and in the appended claims to mean a silicone (polysiloxane) in which all or substantially all of the silicon atoms are each connected to two methyl groups.

Various methods may be employed to prepare the dimethyl silicones used in the practice of this invention. For example, substantially pure dimethyl dichlorosilane or dimethyl dichlorosilane containing up to about 2 mol per cent methyl trihalogenosilane, more specifically methyl trichlorosilane, is hydrolyzed in manners now well known in the art. The oily hydrolysis product may be fractionally distilled to remove the low-boiling materials (trimers, tetramers, etc.), thereby to obtain the higher molecular weight liquid dimethyl silicones, which may then be contacted with the sulfuryl halide to convert it to a dimethyl silicone gum. Optimum properties of the dimethyl silicone gums, as well as of the synthetic elastomers, are obtained from hydrolysis products of a mixture comprising substantially dimethyl dichlorosilane and not more than 0.5 mol per cent methyl trichlorosilane. Stated alternatively, hydrolysis products found useful in the practice of my invention and hereinafter generically referred to as "dimethyl silicones," are those having a methyl-to-silicon ratio of from about 1.98, preferably 1.995, to 2 methyl groups per silicon atom.

More specific directions for the preparation of the dimethyl silicones may be found, e. g., in the copending Patnode applications, Serial Nos. 463,813 and 463,815, filed October 29, 1942, both now abandoned; and in Agens application, Serial No. 526,473, filed March 14, 1944, now Patent No. 2,448,756. All the foregoing applications have been assigned to the same assignee as the present invention.

The transformation of the liquid, oily or crystalline dimethyl silicones to the elastic gum stage in accordance with my invention is not exactly understood, but it is believed to be due to a rearrangement of the repetitive units,

of the dimethyl silicone into polymers of extremely high molecular weight which may best be described as elastic gums or more specifically dimethyl silicone gums. The properties of these gums may be defined as being elastic, that is compressible but capable of returning substantially to their original shape when the pressure is removed. Therefore, by my description of the elastic gums (including elastoplastic gums), I intend to exclude from the definition of "dimethyl silicone gums" or "elastic gums" all materials which are hard and brittle as such. However, it will be apparent to those skilled in the art that the formed elastic gums will include lower as well as higher molecular weight polymers which, if separated into their components, might yield materials varying in properties from thick, sticky masses to very firm, slightly compressible, though still elastic, fractions.

The transformation of the dimethyl silicone to an elastic gum may be accomplished in a number of ways. One method comprises adding the sulfuryl halide, e. g., sulfuryl chloride, to the dimethyl silicone and allowing the mass to remain at normal temperatures for extended periods of time. To hasten the conversion of the dimethyl silicone, the mixture of the dimethyl silicone and the sulfuryl halide may be heated at elevated temperatures ranging from substantially above room temperature up to about 150° C. The time required to convert the dimethyl silicone to the elastic gum stage will differ depending for instance upon the concentration of the sulfuryl halide, the type of dimethyl silicone employed, the temperature at which the conversion is being effected, etc. For example, at room temperatures, from about 10 to 30 or 40 days may be required to convert the dimethyl silicone to an elastic gum having suitable properties. At temperatures of the order of from about 50° to 150° C., the conversion may be effected in from 12 hours to 3 or 4 days.

The amount of the sulfuryl halide employed in the practice of my invention may also be varied over wide limits, depending e. g., upon the temperatures employed, the type of dimethyl silicone used, etc. Thus, by weight, I may use from 1 to as high as 50 per cent of the sulfuryl halide, based on the weight of the dimethyl silicone. Preferably, the amount of the sulfuryl halide is from 2 to 10 per cent of the weight of the dimethyl silicone. If only small amounts of the sulfuryl halide are employed, it is usually not necessary to remove it. However, excess amounts of the sulfuryl halide are preferably removed, for example by washing with water. If the sulfuryl halide employed is a gas at normal temperatures, it may be necessary or desirable to effect the reaction at superatmospheric pressures.

To prepare the synthetic elastomers (synthetic dimethyl silicone elastomers or silicone rubbers), the elastic gum is worked on ordinary mixing (differential) rolls used in milling rubber until it attains the desired consistency for molding or extruding. Various fillers, e. g., titanium dioxide, and cure accelerators, e. g., benzoyl peroxide in an amount equal to from about 0.5 to 5 or 6 per cent, by weight, of the dimethyl silicone gum, may be incorporated during this operation. After being formed into the desired shape, e. g., under heat and pressure, the cured synthetic dimethyl silicone elastomer may be further cured or vulcanized by heating in an oven until the desired degree of cure is obtained. The latter heat treatment in many cases increases the strength properties of the synthetic elastomer.

The liquid dimethyl silicone which I use as the starting material may be obtained by several methods. For example, a pure or substantially pure dimethyl dichlorosilane may be hydrolyzed in water, in aqueous hydrochloric acid, or other hydrolysis media. Although the method of hydrolysis is not critical, I prefer to use a procedure which yields a liquid product containing a minimum of low-boiling polymers. Such products are obtained for example when the hydrolysis is carried out in e. g., an aqueous solution of ferric chloride.

In order that those skilled in the art may better understand how the present invention may be practiced, the following example thereof is given by way of illustration and not by way of limitation. All parts are by weight.

*Example*

A dimethyl silicone was prepared by slowly adding about 600 parts of a dimethyl dichlorosilane fraction containing approximately 0.4 mol per cent methyl trichlorosilane and the balance substantially pure dimethyl dichlorosilane to an amount of water in excess of that required to hydrolyze the aforementioned fraction. The oily layer which formed was separated, washed with water, and dried with sodium carbonate. To 200 parts of this dimethyl silicone was added 100 parts of freshly distilled sulfuryl chloride, and the mixture was heated on a water bath for 6½ hours at a temperature of about 85° to 90° C. At the end of this time the mass had become very viscous and, when heated further with vigorous agitation for 48 hours at about 175° C., an elastic gum was obtained. During this latter heating period, the fumes from the mixture were allowed to escape. The product obtained, which tested negatively for chlorine, was in the form of an elastic gum, brownish in color, and exhibited good elastic properties.

A synthetic dimethyl silicone elastomer was prepared by rolling on a cold mill a mixture of ingredients consisting of 36 parts of the above-described elastic gum, 72 parts titanium dioxide, and 0.72 part benzoyl peroxide dissolved in a small amount of toluene. After milling for about 15 minutes, after which time the ingredients were intimately dispersed in the elastic gum, the mass was removed from the rolls and pressed into the form of a sheet at about 150° C. for 10 minutes under a pressure of approximately 500 pounds per square inch. The sheet was then cured further by heating at 200° C. for 48 hours. The cured sheet had a tensile strength of approximately 400 pounds per square inch, was soft and firm, but pliable.

It is to be understood that fillers other than the one disclosed in the foregoing example may also be used. These include lithopone, zinc oxide, talc, ferric oxide, and other finely divided solid materials often employed as fillers for known natural and synthetic rubbers.

The dimethyl silicone gums and the synthetic dimethyl silicone elastomers prepared therefrom are useful in applications where materials having elastic-like (rubber-like) properties are required, for instance for gaskets, electrical conductor insulation, shock absorbers, etc. Owing to their extraordinary resistance to deterioration at high temperatures, they are particularly useful in applications where natural rubber or other synthetic elastomers (rubbers) fail, due to the deleterious effect of heat. The synthetic dimethyl silicone elastomers prepared from the dimethyl silicone gums made according to my invention are further endowed with the property of retaining their flexibility at low temperatures. Moreover, because of the ability to remove the sulfuryl halide by volatilization, there are no residual acid or corrosive impurities present in the final product. Because of this, the electrical properties of the synthetic dimethyl silicone elastomers are better.

What I claim as new and desire to secure by Letters Patent of the United States is:

1. The method of making a solid, elastic, curable methylpolysiloxane containing an average of from 1.98 to 2.0 methyl groups per silicon atom, which method comprises contacting a liquid polymeric dimethylsiloxane containing an average of from 1.98 to 2.0 methyl groups per silicon atom and containing up to 2 mol per cent copolymerized monomethylsiloxane with from 1 to 50 per cent, by weight, based on the weight of the liquid methylpolysiloxane, of a sulfuryl halide.

2. The method of producing a solid, elastic, curable methylpolysiloxane having the average of from 1.98 to 2.0 methyl groups per silicon atom, which method comprises contacting a liquid polymeric dimethylsiloxane containing an average of from 1.98 to 2.0 methyl groups per silicon atom and containing up to 2 mol per cent copolymerized monomethylsiloxane with from 1 to 50 per cent, by weight, based on the weight of the liquid methylpolysiloxane, of sulfuric chloride.

3. The method of producing a solid, elastic, curable methylpolysiloxane containing an average of from 1.98 to 2.0 methyl groups per silicon atom, which method comprises contacting a liquid polymeric dimethylsiloxane containing an average of from 1.98 to 2.0 methyl groups per silicon atom and containing up to 2 mol per cent copolymerized monomethylsiloxane with from 1 to 50 per cent, by weight, based on the weight of the liquid polysiloxane, of sulfuryl chloride at a temperature ranging from room temperature to 175° C. for a length of time sufficient to convert the liquid methylpolysiloxane to a solid, elastic product.

4. The process of making a synthetic, solid, elastic, heat-cured methylpolysiloxane containing an average of from 1.98 to 2.0 methyl groups per silicon atom, which process comprises (1) treating a liquid polymeric dimethylsiloxane containing an average of from 1.98 to 2.0 methyl groups per silicon atom and containing up to 2 mol per cent copolymerized monomethylsiloxane with from 1 to 50 per cent, by weight, based on the weight of the liquid polysiloxane, of sulfuryl chloride at a temperature of from room temperature to 175° C. for a length of time sufficient to convert the said liquid methylpolysiloxane to a product having solid, elastic properties, (2) compounding the elastic product obtained in (1) with a filler and benzoyl peroxide and (3) advancing the cure of the filled material by the application of heat.

MOYER M. SAFFORD.

No references cited.

Certificate of Correction

Patent No. 2,454,759.

November 30, 1948.

MOYER M. SAFFORD

It is hereby certified that error appears in the printed specification of the above numbered patent requiring correction as follows:

Column 5, line 23, claim 2, for "sulfuric" read *sulfuryl*;

and that the said Letters Patent should be read with this correction therein that the same may conform to the record of the case in the Patent Office.

Signed and sealed this 17th day of May, A. D. 1949.

[SEAL]

THOMAS F. MURPHY,
*Assistant Commissioner of Patents.*